US005216513A

United States Patent [19]

Swank

[11] Patent Number: 5,216,513

[45] Date of Patent: Jun. 1, 1993

[54] CATHODE-RAY TUBE HAVING A SHRINKFIT IMPLOSION PROTECTION BAND WITH FACEPLATE PANEL COMPENSATING MEANS

[75] Inventor: Harry R. Swank, Lancaster, Pa.

[73] Assignee: Thomson Consumer Electronics, Inc., Indianapolis, Ind.

[21] Appl. No.: 738,657

[22] Filed: Jul. 31, 1991

[51] Int. Cl.[5] .......................... H04N 5/65; H01J 29/87

[52] U.S. Cl. .................................... 358/246; 358/245; 220/2.1 A

[58] Field of Search ........................ 358/245, 246, 247; 313/480; 220/2.1 A, 2.3 A; 445/8

[56] References Cited

U.S. PATENT DOCUMENTS

| | | | |
|---|---|---|---|
| 3,708,369 | 1/1973 | Bongenaar et al. | 156/322 |
| 4,121,257 | 10/1978 | Krishnamurthy | 358/246 |
| 4,701,802 | 10/1987 | Omae et al. | 358/246 |
| 5,064,394 | 11/1991 | Swank | 358/246 |

FOREIGN PATENT DOCUMENTS

| | | | |
|---|---|---|---|
| 0009037 | 1/1985 | Japan | 358/246 |
| 0907636 | 2/1982 | U.S.S.R. | 358/246 |

OTHER PUBLICATIONS

U.S. patent application, Ser. No. 677,178 filed on Mar. 29, 1991.

*Primary Examiner*—Edward L. Coles, Sr.
*Assistant Examiner*—Jill Jackson
*Attorney, Agent, or Firm*—Joseph S. Tripoli; Dennis H. Irlbeck; Vincent J. Coughlin, Jr.

[57] ABSTRACT

A cathode-ray tube comprises an evacuated envelope having a faceplate panel with a mold-match line. A luminescent screen is disposed on an inner surface of the panel. The envelope further includes a funnel and a neck portion. The funnel is joined to the panel. An electron gun, for generating and directing at least one electron beam toward the screen, is located in the neck portion. A shrinkfit implosion protection band is fitted on the periphery of the panel to apply a compressive force thereto as a result of the tension of the band. The band includes a double thickness of material, a section of which extends forward of the mold-match line. The band is improved over prior bands by adjusting the effective sectional area of the double thickness portion to a value appropriate to provide deformation compensation to the faceplate panel, thereby maintaining register of the electron beam on the screen.

3 Claims, 3 Drawing Sheets

Fig. 1
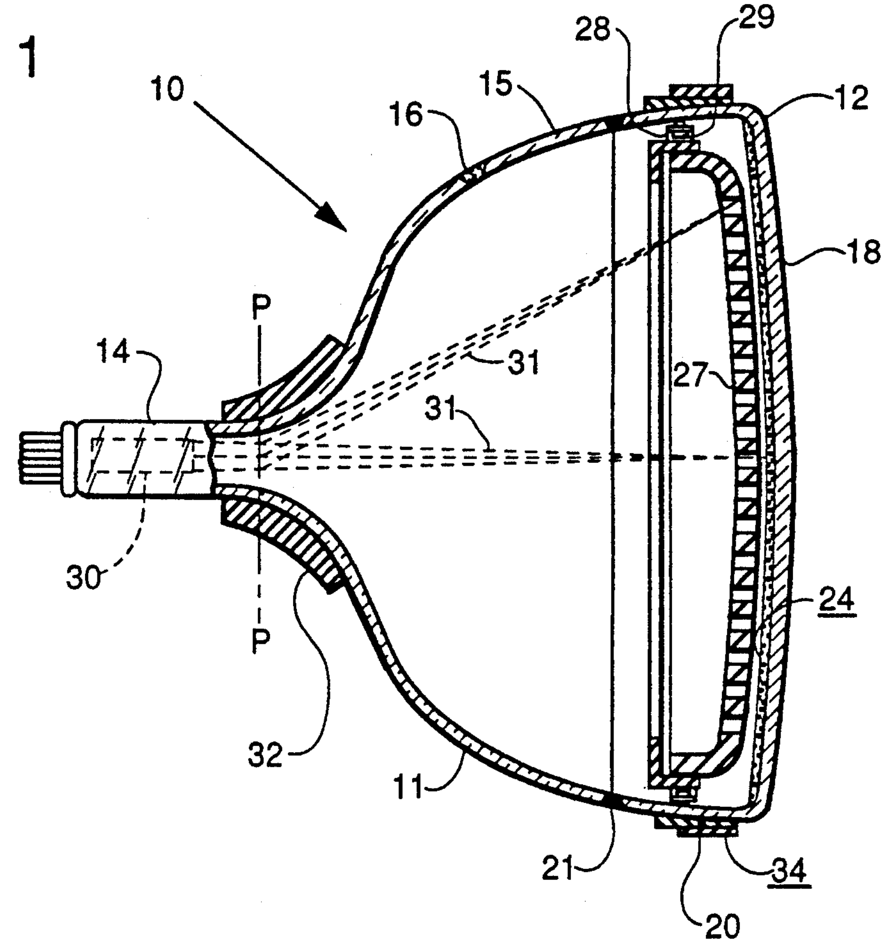
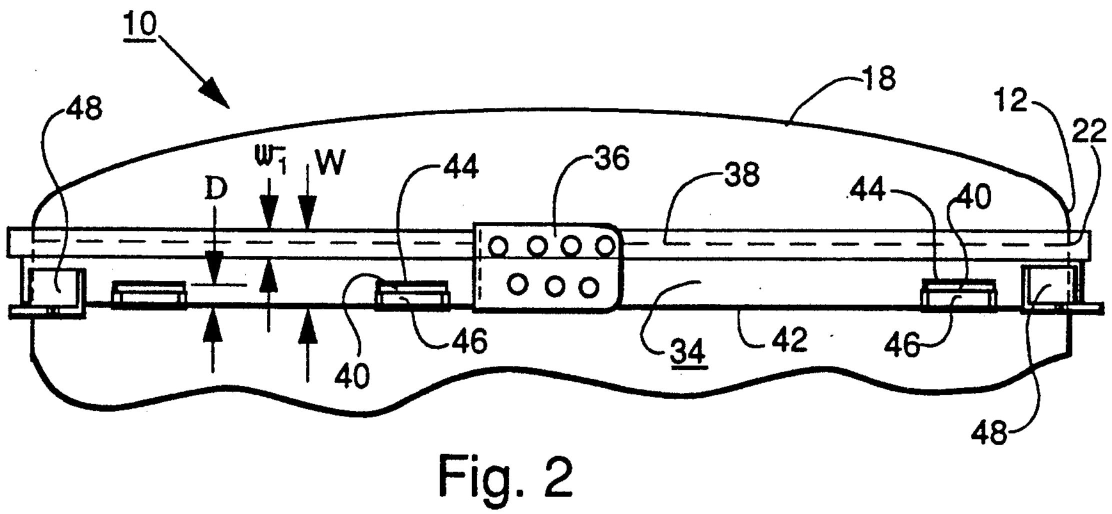
Fig. 2

CATHODE-RAY TUBE HAVING A SHRINKFIT IMPLOSION PROTECTION BAND WITH FACEPLATE PANEL COMPENSATING MEANS

This invention relates generally to a cathode-ray tube (CRT) having a shrinkfit implosion protection band fitted on the periphery of a faceplate panel and, more particularly, to such a CRT having a band which includes means for maintaining register of an electron beam on a luminescent screen disposed on an inner surface of the panel.

BACKGROUND OF THE INVENTION

U.S. Pat. No. 4,701,802, issued to Omae et al. on Oct. 20, 1987, describes a CRT having an explosion-proof, shrinkfit band fitted on the periphery of the panel of the CRT to apply a compressive force to the panel, as a result of tension in the band. The band has recesses formed therein to adjust the effective sectional area of the band to a value appropriate to correct the deformation of the panel caused by the evacuation of the tube. Such deformation causes misalignment, or misregister, of the electron beams on the surface of the screen. The size of the recesses is determined on the basis of a misalignment correction estimated theoretically by using measured data of deformation of the panel, so that deformation of the panel surface is corrected approximately, and thereby misregister of electron beams is minimized.

A drawback of the patented band is that a plurality of prefabricated explosion-proof bands, differing from each other in the length of the recesses, are required to provide a range of tensions which, in turn, provide differing amounts of panel deformation. This presents a problem of maintaining an extensive inventory of bands and also raises the possibility that the wrong band may be installed on a tube, thereby either undercorrecting or overcorrecting the panel deformation.

SUMMARY OF THE INVENTION

A cathode-ray tube comprises an evacuated envelope having a faceplate panel with a mold-match line. A luminescent screen is disposed on an inner surface of the panel The envelope further includes a funnel and a neck portion. The funnel is joined to the panel. An electron gun, for generating and directing at least one electron beam toward the screen, is located in the neck portion. A shrinkfit implosion protection band is fitted on the periphery of the panel to apply a compressive force thereto as a result of the tension of the band. The band includes a double thickness of material, a section of which extends forward of the mold-match line. The band is improved over prior bands by adjusting the effective sectional area of the double thickness portion to a value appropriate to provide deformation compensation to the faceplate panel, thereby maintaining register of the electron beam on the screen.

BRIEF DESCRIPTION OF THE DRAWINGS

FIG. 1 is a plan view, partially in axial section, of a color CRT made according to the present invention.

FIG. 2 is a front view of a portion of the tube and novel implosion protection band.

DETAILED DESCRIPTION OF THE PREFERRED EMBODIMENT

Figure 3:
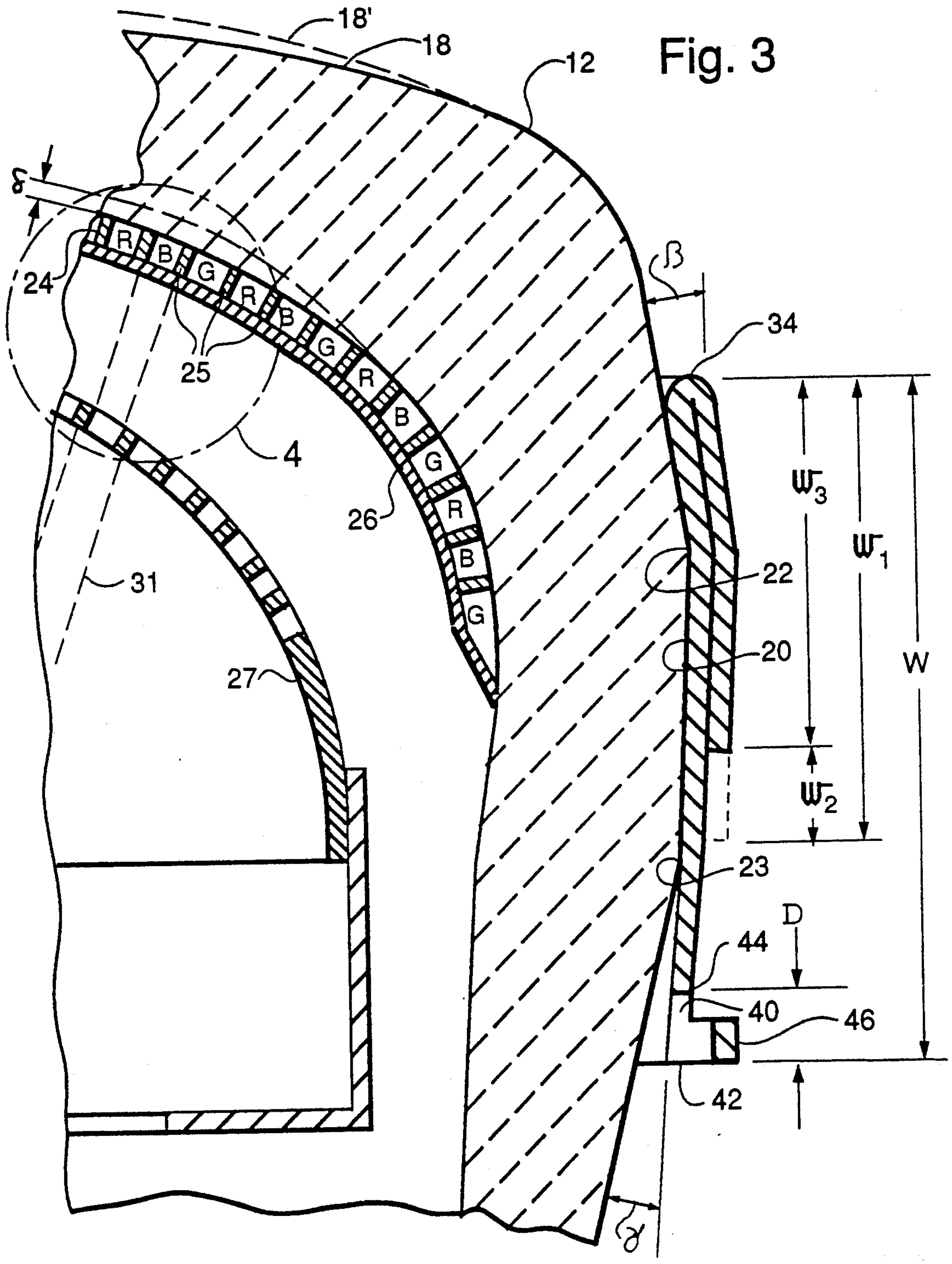
FIG. 3 shows a sectional view of a portion of the faceplate and novel band of the tube shown in FIG. 1.

FIG. 1 shows a color CRT 10 having a glass envelope 11 comprising a rectangular faceplate panel 12 and a tubular neck 14 connected by a rectangular funnel 15. The funnel 15 has an internal conductive coating (not shown) that contacts an anode button 16 and extends into the neck 14. The panel 12 comprises a viewing faceplate or substrate 18 and a peripheral flange or sidewall 20, which is sealed to the funnel 15 by a glass frit 21.

The faceplate panel 12 is produced by molding glass in a two part mold (not shown). Accordingly, the sidewall 20 has a convex seam 22, shown in FIG. 3, commonly called the mold-match line, which is formed where the two parts of the mold meet. Additionally, the sidewall 20 of the faceplate panel 12 is thicker where it joins the viewing faceplate 18 than it is at the open end which is sealed to the funnel 15. The sidewall 20 is angled to improve the molding process and to ease extraction of the molded glass panel from the mold. For this reason, glass forward of the mold-match line 22 is offset and lies at a small angle, $\beta$, with respect to the portion of the sidewall which joins the faceplate. This angle typically is of the order of 5.50° for example. A second convex seam 23, called the break line, is spaced from the mold-match line 22. Glass to the rear of the break line 23 also is angled and lies at an angle, $\gamma$, with respect to the portion of the wall which joins the faceplate. The angle $\gamma$ is typically of the order of 3° to 7°. The angle of the break line further eases extraction of the panel from the mold.

A three color phosphor screen 24 is carried on the inner surface of the faceplate 18. The screen 24, shown in FIG. 3, preferably is a line screen which includes a multiplicity of screen elements comprised of red-emitting, green-emitting and blue-emitting phosphor stripes R, G and B, respectively, arranged in color groups or picture elements of three stripes or triads in a cyclic order and extending in a direction which is generally normal to the plane in which the electron beams are generated. In the normal viewing position of the embodiment, the phosphor stripes extend in the vertical direction. Preferably, the phosphor stripes are separated from each other by a light-absorptive matrix material 25, as is known in the art. Alternatively, the screen can be a dot screen. A thin conductive layer 26, preferably of aluminum, overlies the screen 24 and provides a means for applying a uniform potential to the screen as well as for reflecting light, emitted from the phosphor elements, through the faceplate 18. The screen 24 and the overlying aluminum layer 26 comprise a screen assembly.

With respect again to FIG. 1, a multi-apertured color selection electrode or shadow mask 27 is removably mounted in predetermined spaced relation to the screen assembly, by conventional means comprising a plurality of spring members 28 engaging a stud 29 embedded in the sidewall 20. An electron gun 30, shown schematically by the dashed lines in FIG. 1, is centrally mounted within the neck 14, to generate and direct three electron beams 31 along convergent paths, through the apertures in the mask 27, to the screen 24. The gun 30 may be any type of CRT electron gun known in the art.

The tube 10 is designed to be used with an external magnetic deflection yoke, such as yoke 32, located in the region of the funnel-to-neck junction. When activated, the yoke 32 subjects the three beams 31 to magnetic fields which cause the beams to scan horizontally and vertically in a rectangular raster over the screen 24. The initial plane of deflection (at zero deflection) is shown by the line P—P in FIG. 1, at bout the middle of the yoke 32. For simplicity, the actual curvatures of the deflection beam paths in the deflection zone are not shown.

As shown in FIGS. 2 and 3, a shrinkfit implosion protection band 34 typically is manufactured by forming a strip of steel and joining together the two ends of the strip to form a connective joint 36. The dimensions of the band are expanded by stretching the band into a rectangular loop with round ed corners. The periphery of the loop has cold dimensions slightly smaller than the periphery of the panel 12. The band 34 is heated to approximately 300° to 500° C. to cause it to expand to dimensions that permit the loop to be slipped around the sidewall 20 and to overlie the mold-match line 22. As the band cools, it shrinks and tightly surrounds the faceplate panel, thereby tensioning the band which compresses the sidewall. The compressive force applied to the sidewall can be accurately controlled by controlling the yield point and thickness of the band. As the band cools, almost all forces are directed through the band into the blend areas of the panel where the straight sidewall 20 blends into the curved edge of the panel 12, primarily at the corners where the band 34 is in contact with the corners of the panel sidewall. The forces are thus transferred to the panel corners and into the faceplate panel 12. Because the corners of the band 34 are in contact with the corners of the panel 12, there is substantially no movement of the band, and the sides of the bands can initially adjust themselves and balance the band forces. A substantial portion of the strain in the panel is thus concentrated in the corner blend areas and the tension of the band places a controlled compressive force on the corners of the band, and through the band into the corners of the faceplate panel 12. These inwardly directed compressive forces offset at least some of the outwardly directed tension forces which are produced on the faceplate corners by the atmospheric pressure on the faceplate, when the tube is evacuated. When these forces are balanced, the screen 24 is properly spaced from the shadow mask 27 so that each of the electron beams 31 is in register with the corresponding color-emitting phosphor screen elements, thereby producing proper color purity.

Figure 4:
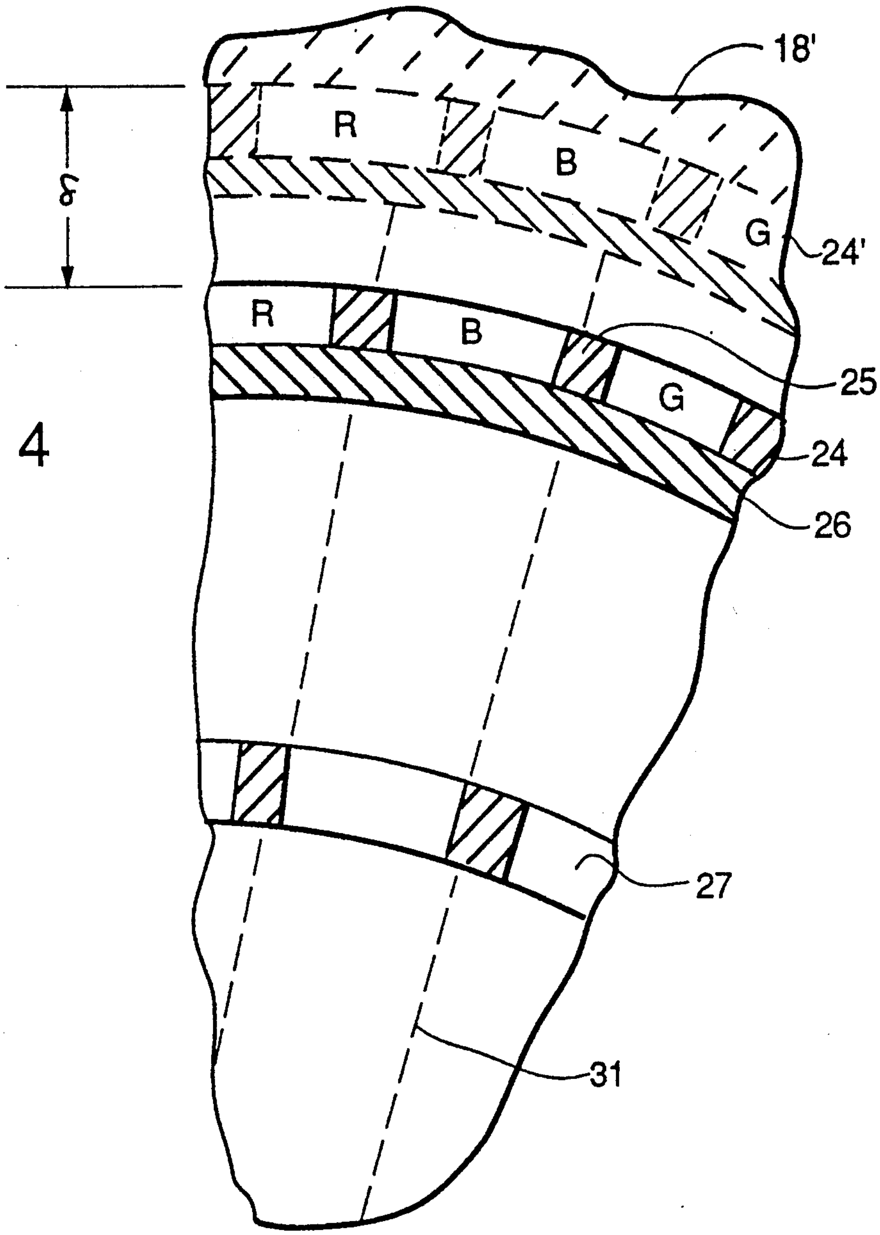
FIG. 4 is an enlarged sectional view of the area within the circle 4 of FIG. 3.

However, if the inwardly directed compressive forced produced by the tension in the band 34 exceeds the outwardly directed tension in the faceplate panel 12 due to atmospheric pressure, the faceplate 18 will dome, i.e., be deformed outwardly, by an amount, δ, proportional to this difference in forces, to a new faceplate position 18', shown in FIGS. 3 and 4. The result of such faceplate doming is to translate the screen 24 to a new screen position 24'. Since the faceplate doming is not necessarily uniform at all points, the shadow mask 27 cannot provide adequate compensation. As a result, the electron beams passing through the apertures in the mask will be misregistered with their corresponding phosphor screen elements. This misregister is shown in FIG. 4. If the faceplate 18 domes a distance δ, the elements of the screen 24 are moved to screen position 24'. An electron beam 31 meant to impinge on a blue-emitting phosphor element of screen 24 now impinges on both the blue-emitting element, at screen location 24', and also, partially, on the adjacent red-emitting element, causing a loss of color purity.

In the present embodiment, the steel strip used to make the band 34 has an overall, unfolded width of about 3.0 inches (76.2 mm), and a thickness within the range of 0.042 to 0.045 inches (1.07 to 1.14 mm). The steel strip also has a yield strength within the range of 37,000 to 47,000 psi. As shown in FIGS. 2 and 3, a portion, $w_1$, of one edge 38 of the strip is folded over to create an overlap and to provide a double thickness of material on the faceplate-side of the band. The folded-over portion $w_1$ has a width of about 1.0 inch (25.4 mm). The band 34 thus has an operable width, W, of about 2.0 inches (50.8 mm). A plurality of openings 40 are formed by, for example, lancing the band 34 adjacent to the opposite, unfolded edge 42. Each of the openings 40 has a base 44 spaced a distance, D, of about 0.375 inches (9.5 mm), from the unfolded edge 42. A narrow strip of band material is formed out of the plane of the band 34 to define a clip-receiving retainer 46 which engages and retains a degaussing coil clip (not shown). A mounting lug 48 is attached to the band 34 at each of the corners to secure the tube 10 within a housing (not shown). As so far described, the band 34 is conventional.

A problem with the band 34 is that variations in the material thickness and yield strength provide significant differences in band tension. While band thickness can be controlled within a relatively narrow range (0.042 to 0.045 in.), the yield strength varies considerably (37,000 to 47,000 psi), and it would be expensive to purchase band material having a more tightly controlled yield strength. Since only that portion of the band adjacent to the blend areas of the faceplate can project a force into the faceplate panel to offset the outwardly directed force in the panel produced by atmospheric pressure, a portion of the band 34 is folded over to create a double thickness of material on the faceplate side of the band. Accordingly, where the amount of the overlap, $w_1$, is 1.0 inch (for a total effective width of 2.0 inches), and the material thickness and yield strength approach the upper limits of 0.045 inch and 47,000 psi, respectively, the tension exerted by the folded-over portion of the band 34 is $$T_1 = Y \times A \text{ where}$$

Y = yield strength = 47,000 psi

A = area = 2 inch × 0.045 in. = 0.09 sq. in.

(1) $T_1$ = 47,000 psi × 0.09 sq. in. = 4230 pounds

The tension provided by a similar folded-over band, having a yield strength of 42,000 psi and a thickness of 0.0435 in., is (2) $T_2$ = 42,000 psi × 2 in. × 0.0435 sq. in. = 3654 pounds It has been determined that when the yield strength and thickness approach the upper limits of 47,000 psi and 0.045 inch, the band tension of 4230 pounds causes excessive deformation, or doming, of the faceplate 18, sufficient to result in misregister of the electron beams.

To maintain register of the electron beams with the color-emitting elements of the screen, implosion protection bands having high yield strength are modified as shown in FIG. 3. The yield strength of the band material is determined for each lot of material. If the yield strength approaches the upper limit of 47,000 psi, the amount of the band overlap, $w_1$, is reduced by an amount $w_2$, to produce a band having an overlap of $w_3$. The reduction in overlap is achieved, for example, by removing a portion of the overlap corresponding to portion $w_2$. The preferred method of removal is to trim the overlapping portion of the band 34. The following example will demonstrate how the tension applied to the blend areas of the faceplate panel 12 is reduced when the overlap is reduced from $w_1$ equal to 1.0 inch, to $w_3$, equal to 0.75 inch. In each instance, the yield strength of the band material is 47,000 psi and the thickness is 0.045 inch.

(1) $T_1 = 47{,}000 \text{ psi} \times 2 \text{ in.} \times 0.045 \text{ in.} = 4230$ pounds (3) $T_3 = 47{,}000 \text{ psi} \times (1 \text{ in.} \times 0.045 \text{ in.} + 0.75 \text{ in.} \times 0.045 \text{ in})$ $T_3 = 47{,}000 \text{ psi} \times (0.045 \text{ sq. in.} + 0.03375 \text{ sq. in.})$ $T_3 = 47{,}000 \text{ psi} \times (0.07875 \text{ sq. in.})$ $T_3 = 3701.25$ pounds The tension of 3701.25 pounds, resulting from the removal of 0.25 inch of the overlapped portion of the band 34 having a maximum thickness of 0.045 inch and a maximum yield strength of 47,000, is equivalent to the tension produced by a band of maximum thickness of 0.045 in., with an overlap of 1 inch but having a yield strength of only 41,125 psi. In other words, the inwardly directed tension of the band can be controlled by adjusting the effective sectional area of the double thickness portion to a value which is appropriate to provide a compressive force to the panel sufficient to offset the outwardly directed force due to the atmospheric pressure on the evacuated tube. The novel band thus prevents doming of the faceplate and maintains register of the electron beam 31 on the screen 24.

GENERAL CONSIDERATIONS

The amount of tension directed into the blend areas of the faceplate is not significantly influenced by the tension contributed by the band material between the break line 23 and unfolded edge 42. As shown in FIG. 3, the break line 23 is remote from the blend areas and if the break angle $\gamma$ is large, the portion of the band 34 to the rear of the break line will not contact the sidewall 20. Even at the minimum break angle, little of the inwardly directed tension from that region of the band will affect the relatively remote blend areas. Accordingly, modifying the unfolded edge 42 of the band 34 will not provide any significant affect to compensate for doming of the faceplate caused by band material having a yield strength near the upper limit. Accordingly, the present invention may be used in combination with the invention described in my copending patent application Ser. No. 677,178, filed on Mar. 29, 1991, and entitled CATHODE-RAY TUBE HAVING A SHRINKFIT IMPLOSION PROTECTION BAND WITH TENSION LIMITING MEANS. In the latter patent application, the tension in the band is maintained below the minimum design limit of the connective joint by providing a plurality of slots in the band which communicate with the openings 40 to reduce the sectional area of the band, near its unfolded edge 42. This not only lowers the tension in the band but also reduces its ultimate tensile strength.

What is claimed is:

1. In a cathode-ray tube comprising an evacuated envelope having a faceplate panel with a mold-match line, a luminescent screen disposed on an inner surface of said panel, said envelope further including a funnel and a neck portion, said funnel being joined to said panel, said neck portion having an electron gun therein for generating and directing at least one electron beam toward said screen and a shrinkfit implosion protection band fitted on the periphery of said panel to apply a compressive force thereto as a result of the tension of said band, said band having a portion with a double thickness of material, a section of which extending forward of said mold-match line, the improvement wherein the effective sectional area of said double thickness portion being adjusted to a value appropriate to provide deformation compensation to said faceplate panel, thereby maintaining register of said electron beam on said screen.

2. In a cathode-ray tube comprising an evacuated envelope having a faceplate panel with a mold-match line, a luminescent screen disposed on an inner surface of said panel, said envelope further including a rectangular funnel and a neck portion, said funnel being joined to said panel, said neck portion having an electron gun therein for generating and directing three electron beams toward said screen, and a shrinkfit implosion protection band of at least one strip of metal having opposite ends secured together at a connective joint, said band being formed into a loop with cold dimensions slightly smaller than the periphery of said panel prior to the application of said band, said band being fitted around the periphery of said panel to apply a compressive force thereto as a result of tension of said band, said band having a partially folded-over portion which creates an overlap and provides a double thickness of material, at least a section of said folded-over portion being located forward of said mold-match line, the improvement wherein the effective sectional area of said folded-over portion of said band being adjusted by removing a sufficient quantity to reduce the amount of the overlap to a value appropriate to prevent deformation of said faceplate panel, thereby maintaining register of said electron beam on said screen.

3. A method of forming a shrinkfit implosion protection band on a cathode-ray tube, said tube comprising an evacuated envelope having a faceplate panel with a mold-match line, a luminescent screen disposed on an inner surface of said panel, said envelope further including a rectangular funnel and a neck portion, said funnel being joined to said panel, said neck portion having an electron gun therein for generating and directing at least one electron beam toward said screen, and said shrinkfit implosion band being fitted on the periphery of said panel to apply a compressive force thereto as a result of the tension of said band, the method comprising the steps of a) determining the thickness and the yield point of the band material, b) calculating the resultant tension of said band for a given width of material, c) forming said band from at least one strip of metal having opposite ends, d) partially folding over a portion of said band to create an overlap and to provide a double thickness of material, e) adjusting the effective sectional area of said folded-over portion of said band by selectively removing a sufficient quantity of band material to reduce the amount of the overlap, f) securing the opposite ends of said band together at a connective joint, g) expanding the dimensions of said band by stretching said band into a loop with cold dimensions slightly smaller than the periphery of said panel prior to the application of said band, h) heating said band so that the dimensions thereof exceed those of the periphery of said panel, i) fitting said band around the periphery of said panel so that at least a portion of said folded-over portion is located forward of said mold-match line, and j) allowing said band to cool to apply a compressive force to said panel, said tension of said band being reduced by reducing the amount of the overlap, thereby correcting deformation of said faceplate panel to maintain register of said electron beam on said screen.

* * * * *

UNITED STATES PATENT AND TRADEMARK OFFICE
CERTIFICATE OF CORRECTION

PATENT NO. : 5,216,513
DATED : June 1, 1993
INVENTOR(S) : Harry Robert Swank

It is certified that error appears in the above-indentified patent and that said Letters Patent is hereby corrected as shown below:

Column 3, line 14, change "around ed" to --rounded--.

Column 3, line 51, change "forced" to --forces--.

Signed and Sealed this

First Day of February, 1994

Attest:

BRUCE LEHMAN

Attesting Officer

*Commissioner of Patents and Trademarks*